(12) United States Patent
Weissbrod et al.

(10) Patent No.: US 9,868,610 B2
(45) Date of Patent: Jan. 16, 2018

(54) BULK WIRE DELIVERY SYSTEM

(71) Applicant: LINCOLN GLOBAL, INC., City of Industry, CA (US)

(72) Inventors: Paul A. Weissbrod, South Euclid, OH (US); Brandon Juszczyk, Mentor-on-the-Lake, OH (US); Dennis K. Hartman, North Ridgeville, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 15/239,905

(22) Filed: Aug. 18, 2016

(65) Prior Publication Data
US 2016/0355368 A1 Dec. 8, 2016

Related U.S. Application Data

(63) Continuation of application No. 13/826,216, filed on Mar. 14, 2013, now Pat. No. 9,421,633.
(Continued)

(51) Int. Cl.
*B65H 49/02* (2006.01)
*B65H 49/08* (2006.01)
(Continued)

(52) U.S. Cl.
CPC .......... *B65H 49/08* (2013.01); *B23K 9/1333* (2013.01); *B65H 49/12* (2013.01); *B65H 57/18* (2013.01); *B65H 2701/36* (2013.01)

(58) Field of Classification Search
CPC ........ B65H 49/12; B65H 57/12; B65H 57/18; B65H 49/08; B23K 9/1333
(Continued)

(56) References Cited

U.S. PATENT DOCUMENTS 1,955,805 A 4/1934 Hanson
2,774,548 A 12/1956 Hanson
(Continued)

FOREIGN PATENT DOCUMENTS

EP 2174741 A1 4/2010
JP 59229287 A 12/1984
(Continued)

OTHER PUBLICATIONS

International Preliminary Report on Patentability for PCT/182013/002841 dated Jul. 9, 2015.
(Continued)

*Primary Examiner* — William A. Rivera
(74) *Attorney, Agent, or Firm* — Perkins Coie LLP

(57) ABSTRACT

The invention described relates generally to a method and apparatus for improving existing bulk wire transfer methodologies and more particularly, to welding wire packages for use as an endless wire container such that the welding wire of multiple containers can be linked together to produce an uninterrupted flow of welding wire to a welding operation by employing a welding wire transfer guide, the guide having an outwardly-facing curvilinear groove, one end of said groove of said welding wire transfer guide positioned along a tangent line running between an outer diameter of the in-process coil of wire and an opposed end of said groove along a tangent line running between an inner diameter of the staged coil of welding wire. The apparatus further includes a magnetically positionable wire guide arm above at least two, preferably each bulk welding wire container.

18 Claims, 4 Drawing Sheets

Related U.S. Application Data

(60) Provisional application No. 61/711,558, filed on Oct. 9, 2012.

(51) Int. Cl.
  *B23K 9/133* (2006.01)
  *B65H 49/12* (2006.01)
  *B65H 57/18* (2006.01)

(58) Field of Classification Search
  USPC .................. 242/170, 129, 171, 172, 615.3
  See application file for complete search history.

(56) References Cited

U.S. PATENT DOCUMENTS

| | | | |
|---|---|---|---|
| 2,942,802 A | 6/1960 | Bachus | |
| 2,944,755 A | 7/1960 | Foster | |
| 3,780,963 A | 12/1973 | Hirschfelder | |
| 4,572,458 A | 2/1986 | Bluhm | |
| 5,816,514 A | 10/1998 | Duclos | |
| 5,971,308 A | 10/1999 | Boulton | |
| 7,041,932 B2 | 5/2006 | Byerly et al. | |
| 7,220,942 B2 | 5/2007 | Barton et al. | |
| 7,309,038 B2 | 12/2007 | Carroscia | |
| 7,615,718 B2 | 11/2009 | Byerly | |
| 8,668,086 B2 | 3/2014 | Gelmetti | |
| 9,421,633 B2 * | 8/2016 | Weissbrod | B65H 49/12 |
| 2006/0278747 A1 | 12/2006 | Carroscia | |
| 2007/0175965 A1 | 8/2007 | Carroscia | |
| 2010/0072317 A1 | 3/2010 | Cooper | |

FOREIGN PATENT DOCUMENTS

| | | |
|---|---|---|
| JP | S61160143 U | 10/1986 |
| JP | 2003019560 A | 1/2003 |

OTHER PUBLICATIONS

International Preliminary Report on Patentability for corresponding application PCT/182013/002237 dated Apr. 23, 2015.

Partial Search Report for corresponding application PCT/182013/002237 dated Apr. 10, 2014.

* cited by examiner

BULK WIRE DELIVERY SYSTEM

CROSS-REFERENCE TO RELATED APPLICATIONS

This application is a continuation U.S. patent application Ser. No. 13/826,216, filed Mar. 14, 2013, which claims the benefit of U.S. Provisional Application No. 61/711,558 filed on Oct. 9, 2012, the contents of each of which are fully incorporated by reference in their entireties.

TECHNICAL FIELD

The invention described herein pertains generally to a method and apparatus for improving existing bulk wire transfer methodologies and more particularly, to welding wire packages for use as an endless wire container such that the welding wire of multiple containers can be linked together to produce an uninterrupted flow of welding wire to a welding operation.

BACKGROUND OF THE INVENTION

Welding wire used in high production operations, such as robotic welding stations, is provided in large packages having over 200 pounds of wire. The welding wire in these packages is looped into convolutions of wire loops forming a wire coil extending around a central core or a central clearance bore.

However, even the use of large packaging does not eliminate down-time for the welding operation when the welding wire of the packaging or container is exhausted. Even if a new container of welding wire is staged for a quick changeover, the welding wire from the new container must be threaded through the feeding apparatuses and to the welding torch. As can be appreciated, this can cause significant downtime, especially for welding operations that consume a large quantity of welding wire. Accordingly, it has been proposed to butt weld the trailing end of the welding wire from one container to the leading end of the welding wire from another container. As the wire is exhausted in one container, the last remaining loop rises in the container and folds over itself to produce an e-script tangle condition. As can be appreciated, the e-script tangle forces the operation to be shut down so that the e-script can be removed.

SUMMARY OF THE INVENTION

In accordance with the present invention, there is provided a welding wire transfer system for use with at least a pair of endless welding wire containers, at least one of said containers is an in-process supply container containing a coil of wire and at least one other of said containers is a staged supply container containing a coil of wire with a start end of said staged container welding wire butt-welded to a tail of said in-process container welding wire, which includes: a vertical shaft; and a horizontal shaft extending normal to the vertical shaft and containing a welding wire transfer guide, the guide having an outwardly-facing curvilinear groove, one end of the groove of the welding wire transfer guide positioned nearly tangent to an outer diameter of the in-process coil of wire and an opposed end of the groove positioned nearly tangent to an inner diameter of the staged coil of welding wire. In one aspect of the invention, the welding wire transfer guide is fixed on said horizontal shaft, while in another aspect of the invention, the welding wire transfer guide is horizontally positionable along the horizontal shaft.

In one embodiment, the welding wire transfer system further includes: a magnetically positionable wire transfer arm, the vertical shaft having a pivotable collar and at least one magnet and a fixed collar having at least two magnets in a spaced apart relationship. In another embodiment, the fixed collar will have at least four magnets in a spaced apart relationship.

Each welding wire container may be fitted with an optional dome having at least two slots in at least one side in a geometric relationship which permits one end of the groove of the welding wire transfer guide which is positioned nearly tangent to the outer diameter of the in-process coil of wire to access at least one of the at least two slots.

In another aspect of the invention, the welding wire transfer guide will act as a retention means for said welding wire as it moves from said staged coil container to the in-process coil container.

In a further embodiment of the invention, a welding wire transfer stand is described for use with at least a pair of endless welding wire containers, at least one of said containers is an in-process supply container containing a coil of wire and at least one other of said containers is a staged supply container containing a coil of wire with a start end of the staged container welding wire butt-welded to a tail of the in-process container welding wire, which includes: a vertical shaft; and a magnetically positionable wire transfer arm proximate to the top, the vertical shaft having a pivotable collar and at least one magnet and a fixed collar having at least two magnets in a spaced apart relationship. The fixed collar may have at least four magnets in a spaced apart relationship.

The welding wire transfer stand may further include: a horizontal shaft extending normal to the vertical shaft and including a welding wire transfer guide, the guide having an outwardly-facing curvilinear groove, one end of the groove of the welding wire transfer guide positioned nearly tangent to an outer diameter of the in-process coil of wire and an opposed end of the groove positioned nearly tangent to an inner diameter of the staged coil of welding wire. The transfer stand may include a welding wire retention means, which may be the welding wire transfer guide.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
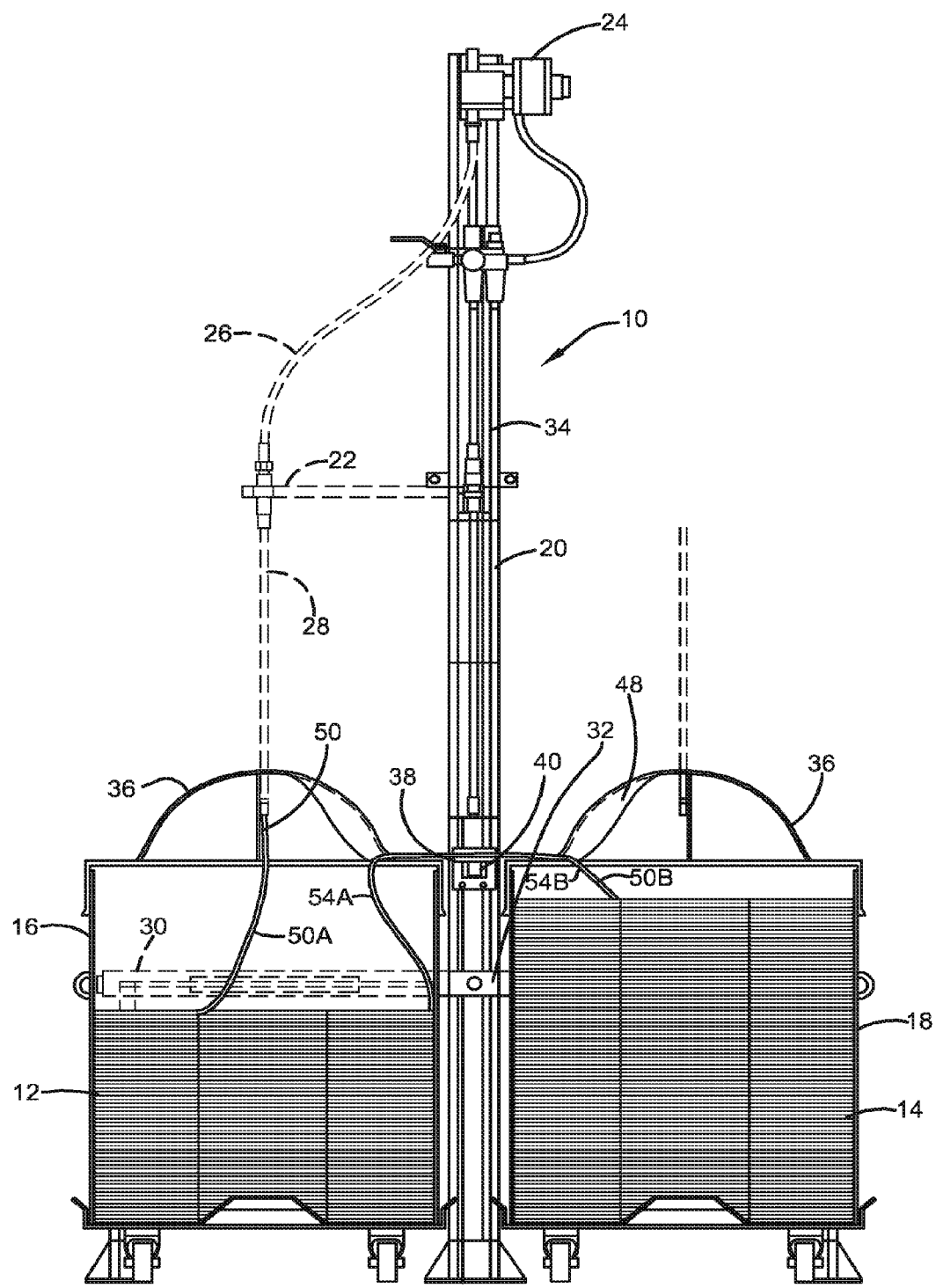
FIG. 1 is a front elevational view of the wire dispensing system showing a pair of wire packages containing welding wire.

As best illustrated in FIG. 1, the invention relates to an "endless" wire transfer stand 10 which involves at least two wire coils of welding wire 12,14 positioned within respective welding wire containers 16,18. Wire dispensing stand 10 includes frame 20, wire transfer arm 22, wire feeder 24, and wire guide conduits 26,28. Frame 10 allows for positioning at least a pair of welding wire coils 12,14 in a side-by-side position. As illustrated in the figure, frame 10 allows for positioning of welding wire containers 16,18 containing respective wire coils 12,14 by horizontal side arms 30 and center arm 32. It is understood that additional welding wire containers with respective welding wire coils may be positioned about wire transfer stand 10 as physical space and geometry permit. Each of these additional welding wire containers may have their respective welding wire "daisy-chained" or welded together as appropriate to meet the needs of the welding operation. Wire transfer stand 10 includes vertical center post 34 positioned between at least two welding wire containers 16,18.

Figure 3:
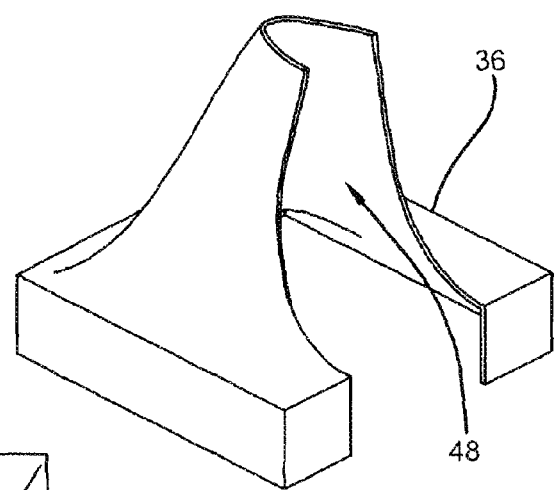
FIG. 3 is a perspective view of the welding wire container top or dome.
Figure 4:
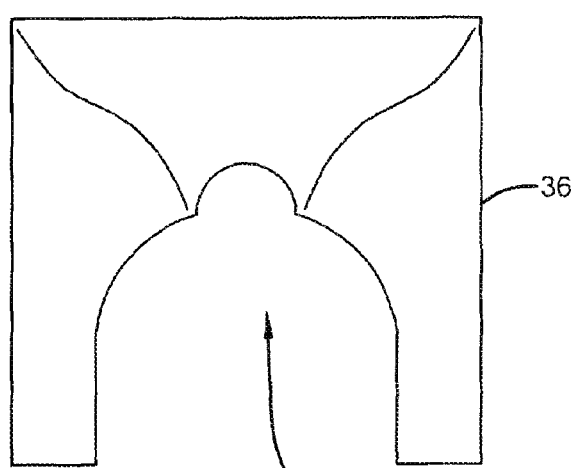
FIG. 4 is top elevational view of a bulk welding wire container top or dome with associated cut-out of FIG. 3.
Figure 7:
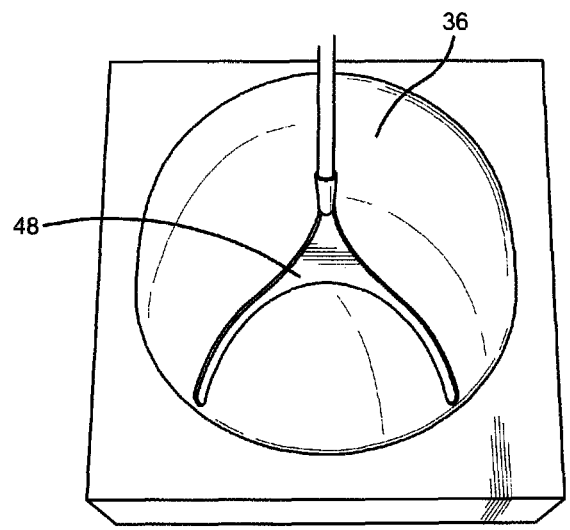
FIG. 7 is a top perspective view of an alternative embodiment of a welding wire container top or dome illustrating a wishbone series of slots.

As illustrated in FIGS. 3, 4 & 7, each of at least two welding wire containers 16,18 further may optionally include a removable generally hemispherical top or other geometrically-shaped dome 36 positioned thereupon, recognizing that the inclusion of a top is optional and not a required aspect of the invention, the top typically serving to prevent welding contaminants from coming into contact with the welding wire. In one aspect of the invention, the top of each welding wire container is essentially identical and positioned about a top periphery of each container in a mirror image fashion, the dome having at least a partial cut-out portion 48 sufficiently sized for access of guide conduit 28 as well as wire guide conduit transfer component 38 when positioned either in a left-to-right or right-to-left orientation when wire guide conduit transfer component 38 is positioned thereupon and affixed to shaft 40. As illustrated in FIG. 7, one wishbone aperture is illustrated which permits the alignment described hereinbefore. However, when multiple containers are employed with the optional tops or domes, it is recognized that multiple wishbone apertures would be positioned about the center of the top or dome.

Figure 2:
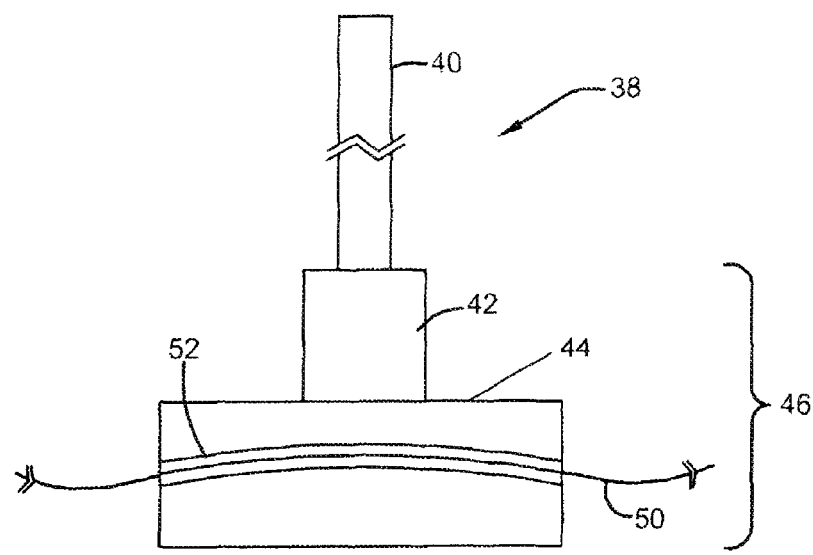
FIG. 2 is an enlarged top elevational view of reversible welding wire transfer plate illustrating an outwardly facing curvilinear transfer tube.
Figure 5:
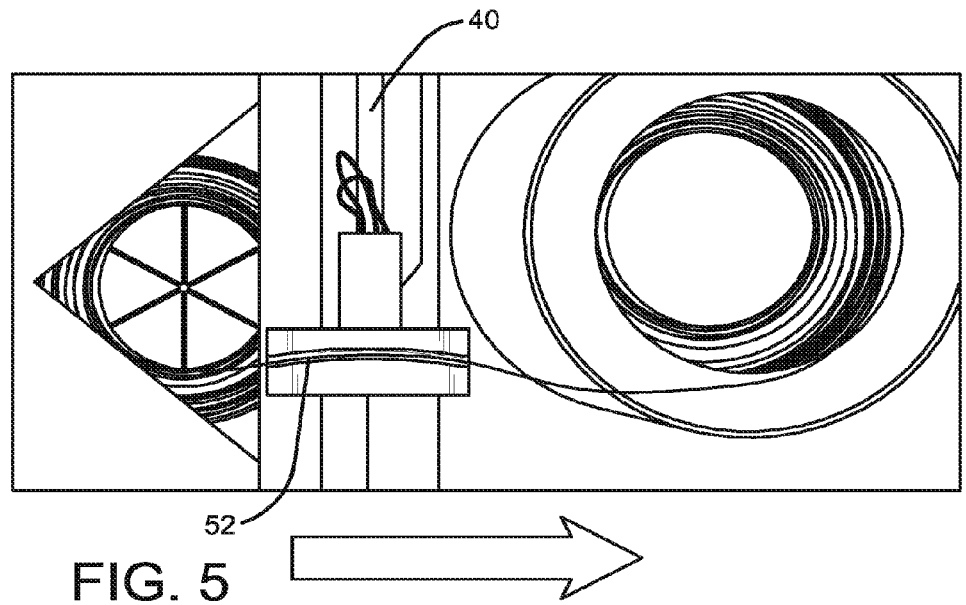
FIG. 5 is a top elevational view of two adjacent wire dispensing packages with proper positioning of an outwardly facing curvilinear transfer tube in which the welding wire is being fed in a left to right manner and for which the in-process coil of wire is positioned to the right and the staged coil of wire is positioned to the left, the positioning of the respective ingress and egress openings in the transfer tube being along a tangent line running between the outer diameter of the in-process coil of wire and the inner diameter of the staged coil of wire.
Figure 6:
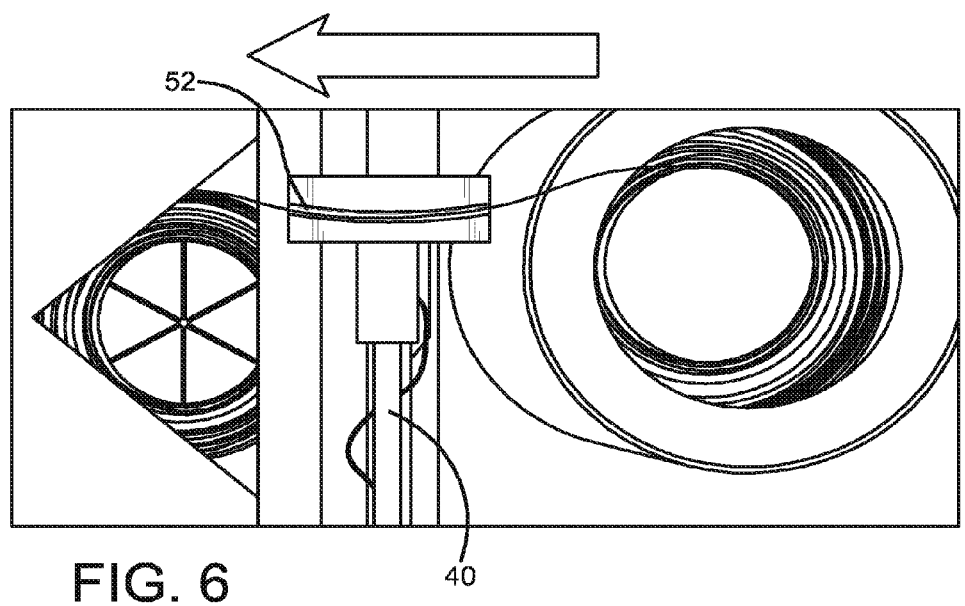
FIG. 6 is a top elevational view of two adjacent wire dispensing packages with proper positioning of an outwardly facing curvilinear transfer tube in which the welding wire is being fed in a right to left manner and for which the in-process coil of wire is positioned to the left and the staged coil of wire is positioned to the right, the positioning of the respective ingress and egress openings in the transfer tube being along a tangent line running between the outer diameter of the in-process coil of wire and the inner diameter of the staged coil of wire.

As better illustrated in FIG. 2, wire guide transfer component 38 includes top plate 42 with wire transfer plate 44 affixed thereto, the combination forming fixed wire transfer plate 46 which is insertable onto or into shaft 40 using known mechanical affixing methods known to those skilled in the art. A non-limiting and exemplary list is for shaft 40 to be an n-sided shaft (wherein n is at least three) with a mating shaft opening attached to the bottom of top plate 42. Alternatively, shaft 40 may be essentially circular with a mating shaft opening attached to the bottom of top plate 42 and wherein rotation is inhibited by the inclusion of a set screw. Yet another approach involves the concept of a notched rest. The top of wire transfer plate 44 has a retention groove 52 through which welding wire 50 travels during the cross-over from one welding wire staged container into an in-process container. The orientation of groove 52 has been determined to at least play a role in minimizing various possible welding wire tangles, e.g., the tendency of bulk welding wire during payout to form an "e-script" among others. As better illustrated in FIG. 5, the wire transfer plate is oriented in anticipation of a left to right transfer, i.e., the in-process coil of wire is positioned to the right and the staged coil of wire is positioned to the left, and the positioning of groove 52 is from a nearly tangent line running between the outer diameter of the in-process coil of wire and the inner diameter of the staged coil of wire, this positioning determined by the direction of transfer. The tangent line described is the natural line which the welding wire takes during the transfer from the just-emptied wire package to the full endless wire package, and which serves to reduce imposed stress energy in the wire transfer loop that often leads to tangling opportunities. Additionally, and counterintuitively, curved retention groove 52 is oriented in a curvilinear manner in which the direction of the curve is facing outwardly and the inlet and outlets of the curved retention groove are positioned approximately nearly along a tangent line between the outer diameter of the in-process coil of wire and the inner diameter of the staged coil of wire. As illustrated in FIG. 6, by repositioning and turning reversible wire transfer plate 46 by 180. degree. around the pivot point, wire payouts which are directioned from right to left are accommodated. It is further recognized that shaft 40 is vertically positionable and fastenable upon vertical center post 34 to permit different height wire containers. It is further recognized that the pivot point of reversible wire transfer plate 46 is also vertically adjustable.

As illustrated in FIG. 1, dome 36 is optional and illustrated as generally hemispherical in shape. However, as illustrated in FIGS. 3, 4 & 7, the geometry may be other than hemispherical, and may be rectangular-shaped at a base and more frustoconical as the dome progresses toward its apex. In either shape, dome 36 will have an apertured side in which cut-out 48 extends from a top of the dome to the base of the dome. As illustrated in FIGS. 5 & 6, a transfer system is illustrated in which no domes are positioned upon the bulk wire dispensing containers, the containers either having no lids or partial lids which have appropriate cut-outs sufficiently dimensioned to permit the wire to transition between containers.

In one embodiment of the invention, wire transfer arm 22 is pivotally mounted on vertical center post 34 and has 360° of rotation. The arm rotates with bearings. This configuration permits more than two welding wire containers to be pre-positioned and joined in an array about post 34, allowing larger amounts of wire to be run in a continuous fashion with resultant reductions in attendant time for the package setup technician.

Figure 8:
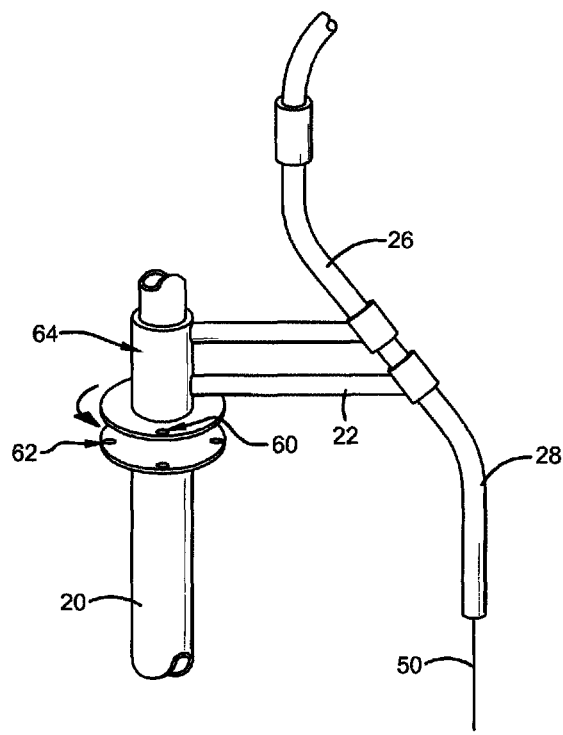
FIG. 8 is a side view of a top portion of a magnetic rotating welding wire guide.

As better illustrated in FIG. 8, in one implementation of this embodiment, conduit support arm 22 is pivotable about frame 20 into defined and fixed positions by the matching of at least one magnet 60 within bearing block collar 64 and fixed positioning magnets 62 on top of frame column 20. This arrangement allows magnetic stops to couple without having to hit a stop and allow the necessary positioning during normal dispensing, but break free to follow the transfer wire. Therefore, as the welding wire is completely dispensed from the in-process coil of wire package, the magnetic force to retain the wire transfer arm over that package is overcome and the arm pivots to a position above what had previously been the staged coil of wire package. The sequence for the wire transfer arm is repeated for each successive wire package, illustrated to be approximately 90° in FIG. 8.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welding wire transfer system for use with at least a pair of endless welding wire containers, at least one of said containers is an in-process supply container containing an in-process coil of wire and at least one other of said containers is a staged supply container containing a staged coil of wire with a start end of said staged coil of wire butt-welded to a tail end of said in-process coil of wire, said welding wire transfer system comprising:
a vertical shaft; and
a horizontal shaft extending normal to said vertical shaft and comprising a welding wire transfer guide, said guide having a curvilinear groove, one end of said curvilinear groove of said welding wire transfer guide positioned nearly tangent to an outer diameter of the in-process coil of wire and an opposed end of said curvilinear groove positioned nearly tangent to an inner diameter of the staged coil of wire, wherein the one end and the opposed end of the curvilinear groove are positioned nearly along a tangent line between the outer diameter of the in-process coil of wire and the inner diameter of the staged coil of wire.

2. The welding wire transfer system of claim 1 wherein said welding wire transfer guide is fixed on said horizontal shaft.

3. The welding wire transfer system of claim 1 wherein said welding wire transfer guide is horizontally positionable along said horizontal shaft.

4. The welding wire transfer system of claim 1 wherein each of said in-process supply container and said staged supply container further comprise a dome having at least two slots in at least one side in a geometric relationship which permits the one end of said curvilinear groove of said welding wire transfer guide, which is positioned nearly tangent to said outer diameter of the in-process coil of wire, to access at least one of said at least two slots.

5. A welding wire transfer system for use with at least a pair of endless welding wire containers, at least one of said containers is an in-process supply container containing an in-process coil of wire and at least one other of said containers is a staged supply container containing a staged coil of wire with a start end of said staged coil of wire butt-welded to a tail end of said in-process coil of wire, said welding wire transfer system comprising:
a vertical shaft; and
a horizontal shaft extending normal to said vertical shaft and comprising a welding wire transfer guide, said guide having a groove, one end of said groove of said welding wire transfer guide positioned nearly tangent to an outer diameter of the in-process coil of wire and an opposed end of said groove positioned nearly tangent to an inner diameter of the staged coil of wire, wherein the one end and the opposed end of the groove are positioned nearly along a tangent line between the outer diameter of the in-process coil of wire and the inner diameter of the staged coil of wire; and
said welding wire transfer guide acting as a retention means for said staged coil of wire as it moves from said staged supply container to said in-process supply container.

6. The welding wire transfer system of claim 5 wherein said groove is curvilinear and outwardly-facing.

7. The welding wire transfer system of claim 5 wherein said welding wire transfer guide is fixed on said horizontal shaft.

8. The welding wire transfer system of claim 5 wherein said welding wire transfer guide is horizontally positionable along said horizontal shaft.

9. The welding wire transfer system of claim 5 wherein each of said in-process supply container and said staged supply container further comprise a dome having at least two slots in at least one side in a geometric relationship which permits the one end of said groove of said welding wire transfer guide, which is positioned nearly tangent to said outer diameter of the in-process coil of wire, to access at least one of said at least two slots.

10. A welding wire transfer system, comprising:
an in-process supply container containing an in-process coil of wire;
a staged supply container containing a staged coil of wire having a start end butt-welded to a tail end of the in-process coil of wire;
a vertical shaft; and
a horizontal shaft extending normal to the vertical shaft and comprising a welding wire transfer guide, the guide having a groove, one end of the groove of the welding wire transfer guide positioned nearly tangent to an outer diameter of the in-process coil of wire and an opposed end of the groove positioned nearly tangent to an inner diameter of the staged coil of wire, wherein the one end and the opposed end of the groove are positioned nearly along a tangent line between the outer diameter of the in-process coil of wire and the inner diameter of the staged coil of wire.

11. The welding wire transfer system of claim 10, wherein the welding wire transfer guide is fixed on the horizontal shaft.

12. The welding wire transfer system of claim 10, wherein the welding wire transfer guide is horizontally positionable along the horizontal shaft.

13. The welding wire transfer system of claim 10, wherein the groove is curvilinear.

14. The welding wire transfer system of claim 10, wherein the groove is configured as a retention means for the staged coil of wire as the staged coil of wire moves from the staged supply container to the in-process supply container.

15. The welding wire transfer system of claim 10, further comprising a magnetically positionable wire transfer arm, the vertical shaft having a pivotable collar with at least one magnet and a fixed collar with at least two magnets in a spaced apart relationship.

16. The welding wire transfer system of claim 15, wherein the fixed collar has at least four magnets in a spaced apart relationship.

17. The welding wire transfer system of claim 10, further comprising a magnetically positionable wire transfer arm proximate to a top of the vertical shaft, the vertical shaft having a pivotable collar with at least one magnet and a fixed collar with at least two magnets in a spaced apart relationship.

18. The welding wire transfer system of claim 17, wherein the fixed collar has at least four magnets in a spaced apart relationship.

* * * * *